(No Model.) 2 Sheets—Sheet 1.

H. F. MANN.
CAR WHEEL.

No. 468,676. Patented Feb. 9, 1892.

on line 2-2.

Witnesses
Raymond F. Barnes
W. R. Kennedy

Inventor
H. F. Mann
By Phil. T. Dodge
Attorney (No Model.) 2 Sheets—Sheet 2.

H. F. MANN.
CAR WHEEL.

No. 468,676. Patented Feb. 9, 1892.

on line 10-10.

Witnesses
Raymond F. Barnes
N. R. Kennedy

Inventor
H. F. Mann,
By Phil. T. Dodge
Attorney

UNITED STATES PATENT OFFICE.

HENRY F. MANN, OF ALLEGHENY, PENNSYLVANIA.

CAR-WHEEL.

SPECIFICATION forming part of Letters Patent No. 468,676, dated February 9, 1892.

Application filed October 16, 1891. Serial No. 408,941. (No model.)

*To all whom it may concern:*

Be it known that I, HENRY F. MANN, of Allegheny, county of Allegheny, and State of Pennsylvania, have invented a new and useful Improvement in Car-Wheels, of which the following is a specification.

The object of my invention is to produce from sheet metal a light, strong, and cheap wheel adapted for use on hand-cars, railroad-velocipedes, and other vehicles.

To this end the invention consists in various improvements in the manner of constructing and uniting the spokes, the rim, and the hub, as hereinafter explained.

Figure 1:
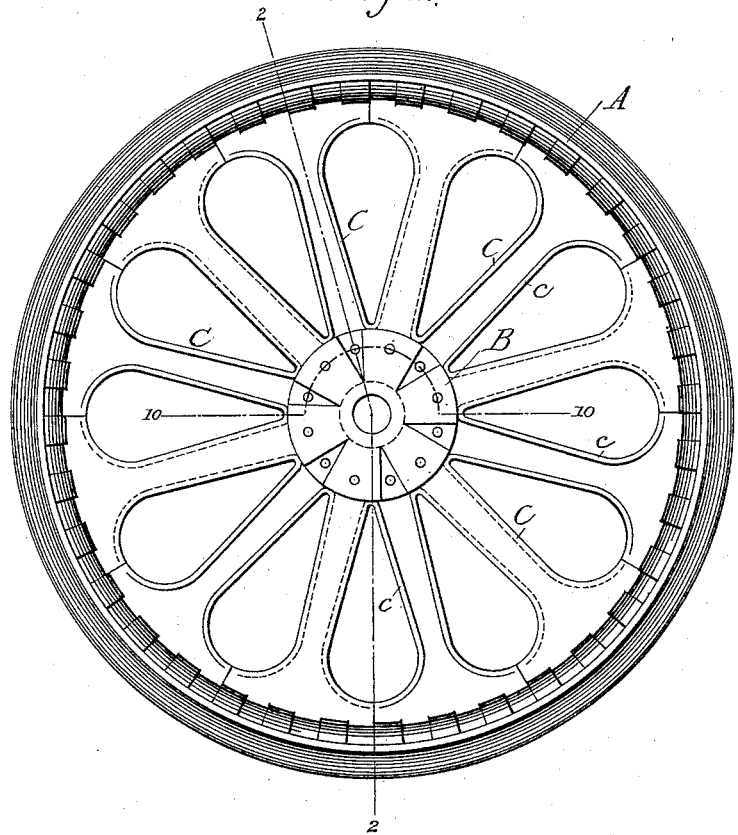
Figure 2:
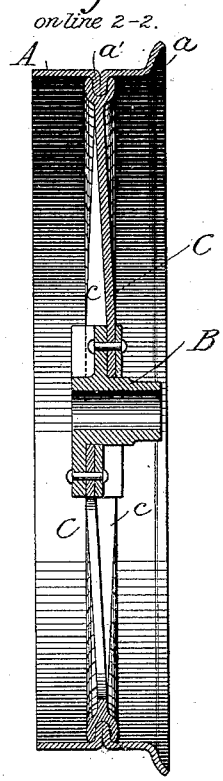
Figure 3:
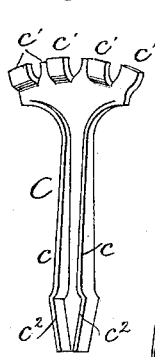
Figure 4:
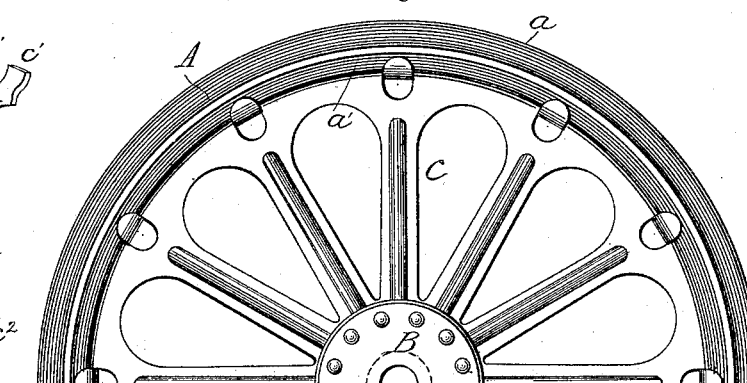
Figure 5:
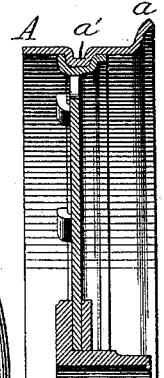
Figure 6:
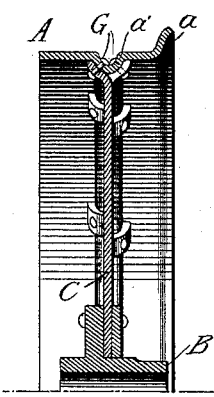
Figure 7:
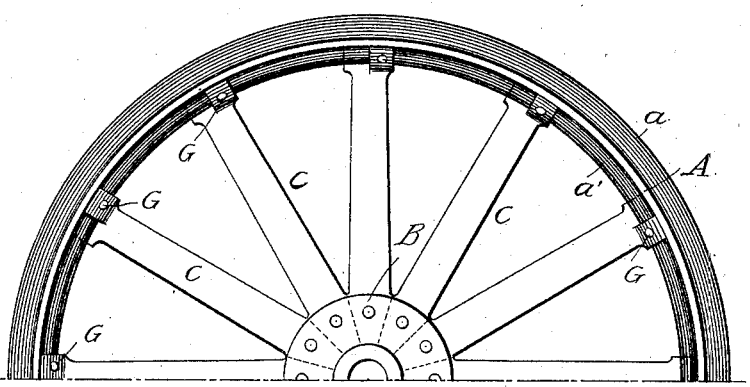
Figure 8:
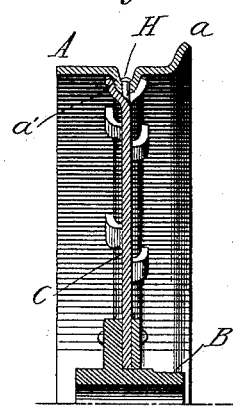
Figure 9:
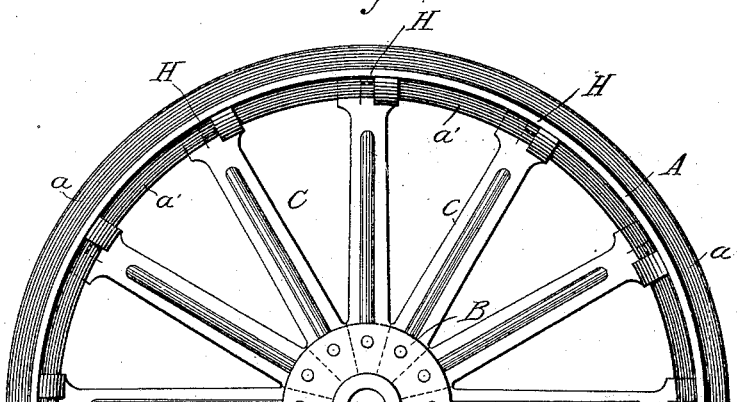
Figure 10:
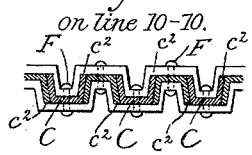

In the accompanying drawings, Figure 1 is a face view of a wheel constructed in accordance with my invention; Fig. 2, a cross-section of the same on the line 2 2. Fig. 3 is a view of one of the spokes. Fig. 4 is a face view of the wheel in a slightly-different form; Fig. 5, a cross-section of the same on the line 5 5. Fig. 6 is a cross-section through one side of the wheel with the parts in slightly-different form. Fig. 7 is a side view of the same. Figs. 8 and 9 are respectively a cross-section and a side view of a portion of the wheel in still another form. Fig. 10 is a cross-section on the line 10 10 of Fig. 4, showing the manner in which the spokes are connected to the hub.

My wheel consists in each of its forms of a rim or tire A, a central hub portion B, and a series of intermediate sheet-metal spokes C.

In the form shown in Figs. 1, 2, and 3 the rim A is constructed of a single piece of sheet metal, which is pressed, spun, or otherwise formed so as to present a flat tread to run upon the rails and with an outwardly-turned rail-flange $a$ at one edge, and also with the inwardly-projecting flange or rib $a'$, encircling the inner surface midway between the two edges, or thereabout. The outer or rail flange may be of any approved form in cross-section. The inner flange $a'$ is produced by indenting or creasing the metal and forcing the same inward below the outer surface. The inner flange $a'$ may be pressed or closed together, as shown in Fig. 2, so that the wheel presents an unbroken surface on the tread, or the flange may be left open or hollow on the outside, as shown in Figs. 5 and 6, for purposes which will presently appear.

The spokes B, as shown in the first three figures, consist each of a piece of sheet metal stamped or cut by suitable dies and corrugated longitudinally, as shown at $c$, in order to give them additional stiffness. The corrugation may be of any desired form in cross-section. The greatest rigidity is obtained by bending up the edges of the spokes along their edges, so as to form flanges thereon. At the outer end the spoke is adapted to fit within the rim of the wheel and is incised to produce a series of lips $c'$, which are bent alternately to the right and left, in order that they may straddle or embrace the flange $a'$ on the inside of the rim when they are in place, as plainly shown in Figs. 1 and 2. The inner ends of the spokes may be formed and united in any suitable manner.

As shown in Figs. 1, 2, 3, and 10, the inner ends of the spokes are tapered and their edges turned upward, so as to form flanges $c^2$. When the spokes are fitted together, these flanges at their inner ends form wide bearing-faces standing in radial lines. I arrange the spokes, as shown in Fig. 10, so that they successively present their flanges in reverse directions—that is to say, the flanges of one spoke facing to the right and those of the next to the left, and so on, repeatedly.

I construct the hub from sheet or cast metal, with its side faces recessed to admit of the spokes being seated firmly therein. In section on line 10 10 the web or flange of the hub will present a sinuous or zigzag form, (shown in Fig. 10,) so as to afford bearings or sockets into which the spokes may be firmly seated and in which they may be secured by rivets F, as shown, or any other suitable manner.

When the wheel is to be constructed as above, the spokes are first placed at their outer ends astride of the flange $a'$ and fitted together at their inner ends, after which the hub is secured to them.

While I prefer to construct the spokes separately, as represented in Figs. 1 and 3, it is to be understood that two, three, or more spokes may be punched from sheet metal in a single piece, or that the entire web of the wheel may be formed from a single sheet of metal, provided that the outer edge is formed with lips to engage the internal flange of the rim. These lips at the outer end of the spokes may be variously formed, the only essential requirement being that they shall be integral with the spoke or web and that they shall embrace the flange $a'$.

In Figs. 4 and 5 I have represented the lips as being punched out of the spokes at one end and turned or bent outward, so that while the spoke is seated against one side of the flange $a'$ the lip will extend over and embrace the opposite side of the flange.

As an additional means of securing the outer ends of the spokes in place, I may pass rivets G through their lips and through the rim, as shown in Fig. 6.

In this form of wheel the hollow flange $a'$, presenting a groove in the outer side, as before mentioned, is advantageous, for the reason that it affords a space for the rivet-heads below or within the tread.

In place of or in addition to the rivets I propose to form each spoke with a tenon H on its outer end (see Figs. 8 and 9) to be projected through and riveted down on the outside of the rim.

As before mentioned, the hub may be variously formed and the spokes attached thereto in different ways, although the plan shown in Figs. 1, 2, and 10 is preferred.

In Fig. 7 the inner ends of the spokes are left flat and seated between a flange on one end of the hub and a flat ring on the opposite side, rivets being passed through the three parts to bind them together.

Having thus described my invention, what I claim is—

1. In a car-wheel, a metal rim having a flange on its inner face, in combination with metal spokes, the outer ends of which are incised to form lips which straddle or embrace the flange.

2. A sheet-metal rim for a car-wheel, having an integral spoke-receiving flange pressed inward therefrom and an integral outwardly-extending rail-flange, substantially as described.

3. In a car-wheel, a sheet-metal rim having a flange pressed inward therefrom, in combination with sheet-metal spokes having at their outer ends lips to embrace said flange.

4. In a car-wheel, the combination of a rim having a flange on its inner face, in combination with sheet-metal spokes the outer ends of which have lips which embrace the flange and tenons which are riveted into the rim.

5. A rim for a car-wheel, formed from sheet metal with an external rail-flange and with two internal circumferential ribs.

6. In a car-wheel, sheet-metal spokes flanged along their edges, the successive spokes having their flanges extended in reverse directions.

7. In a car-wheel, a hub provided with a sinuous spoke-receiving socket, in combination with flanged spokes seated in said socket side by side with their flanges abutting, substantially as described.

8. In a wheel, a series of sheet-metal spokes each having its inner end provided with longitudinal flanges along the edges, said flanged ends being fitted together, substantially as shown.

In testimony whereof I hereunto set my hand, this 13th day of October, 1891, in the presence of two attesting witnesses.

HENRY F. MANN.

Witnesses:
W. R. KENNEDY,
RAYMOND F. BARNES.